Dec. 9, 1958 H. H. RENNEKER 2,863,954

TELEPHONE HAND SET SUPPORTS

Filed Jan. 23, 1957 2 Sheets-Sheet 1

INVENTOR
HERMAN H. RENNEKER

BY Baldwin & Wight
his ATTORNEYS

Dec. 9, 1958 H. H. RENNEKER 2,863,954

TELEPHONE HAND SET SUPPORTS

Filed Jan. 23, 1957 2 Sheets-Sheet 2

INVENTOR

HERMAN H. RENNEKER

BY Baldwin & Wight
his ATTORNEYS

United States Patent Office 2,863,954
Patented Dec. 9, 1958

2,863,954

TELEPHONE HAND SET SUPPORTS

Herman H. Renneker, Palm Springs, Calif., assignor to H. H. Renneker Co., Inc., San Diego, Calif, a corporation of California Application January 23, 1957, Serial No. 635,698
11 Claims. (Cl. 179—157)

This invention relates to telephone hand set supports, and more particularly to improvements in hand set supports of the kind including a socket, seat or the like for connection to a telephone hand set, and a cradle or the like adapted to be rested upon the telephone user's shoulder for comfortably supporting the telephone instrument in proper position in relation to the user's ear and mouth.

In my prior Patent 2,476,221, granted July 12, 1949, there is disclosed a simple and effective hand set support capable of being adjusted to suit the physical requirements of different users. The present invention provides improvements, especially with respect to simplifying the adjusting or relative positioning of the parts, more particularly for effecting the adjustments required for conditioning the support for being rested upon the left or right shoulder, according to the preference of the individual user.

An object of the invention is to provide an improved device of the character stated the parts of which may easily be adjustably assembled relatively to each other and to a telephone hand set with a minimum susceptibility to error on the part of the user, and with a minimum chance of dropping and perhaps losing individual parts as an incident to adjusting or relatively re-positioning the parts.

Another object of the invention is to provide a construction of the kind referred to in which all necessary re-positioning of the parts for changing the assembly for right or left shoulder supporting can be effected without completely detaching any of the parts from the others.

Other objects of the invention will become apparent from a reading of the following description, the appended claims, and the accompanying drawings, in which:

Figure 1:
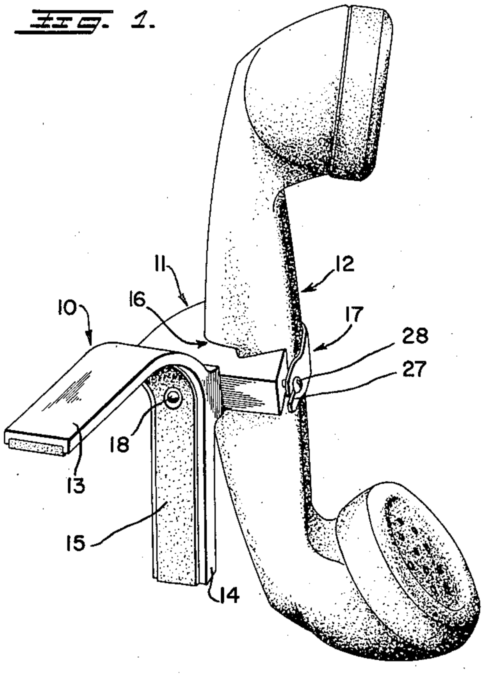
Figure 1 is a perspective view of a telephone hand set support embodying the invention in a preferred form with the parts so relatively positioned and a telephone hand set so attached thereto as to enable the support and hand set to be rested upon the user's left shoulder.
Figure 2:
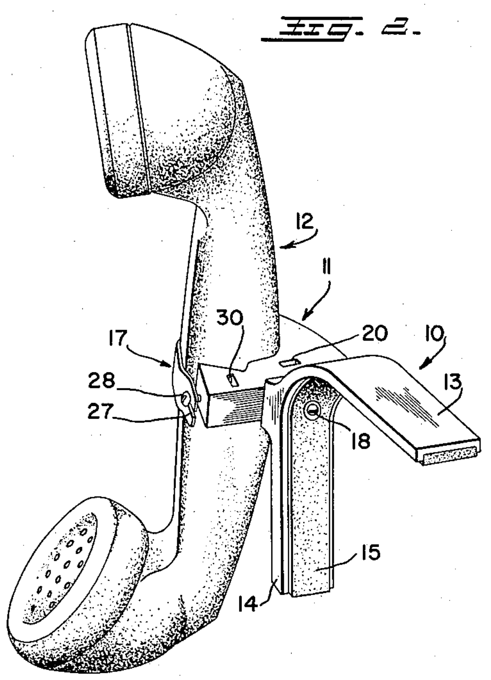
Figure 2 is a perspective view showing the parts so relatively positioned as to adapt the assembly for being supported on the user's right shoulder.

The preferred telephone hand set support construction shown in Figures 1 to 5 includes a shoulder rest part 10, and a hand set attaching part 11 secured to the shoulder rest part 10 in adjusted position and being adapted removably to receive the graspable part of a conventional telephone hand set 12. For enabling the assembly to be held comfortably on the user's shoulder, the shoulder rest part 10 is formed in angular or curved shape to provide a leg 13 adapted to extend horizontally over the shoulder and a depending leg 14 which may extend downwardly in front of the shoulder. Increased comfort is provided by equipping the inside of the shoulder rest part 10 with a facing of rubber or similar cushioning material.

The attaching part 11 is formed with a socket 16 shaped so as generally to conform to the shape of the hand set graspable part and to receive the latter snugly. A retaining member 17 is secured at its opposite ends to the socket member 11 for spanning the socket 16 and retaining the hand set securely in the socket.

In order that the shoulder rest part 10, the socket part 11 and the hand set 12 may be assembled in different relationships for enabling the assembly to be supported upon either the user's left shoulder or right shoulder with the telephone instrument properly located with respect to the user's mouth and ear, the socket part 11 and shoulder rest part 10 are adapted to be secured together in either of two different positional relations and the socket 16 and retaining member 17 are adapted to secure the hand set 12 in either of two positional relations. For securing the socket part 11 to the shoulder rest 10 in the desired positional relation, a screw 18 extends through aligned openings in the shoulder rest 10 and in the socket part 11, and has threaded connection with a nut 19 positioned within a nut receiving slot 20 in the socket part 10 intersected by the aligned openings in the parts 10 and 11. In order to permit the socket part 11 to be secured to the shoulder rest part 10 in one of only two positional relatious, the shoulder rest part 10 is formed with an oblong rectangular recess 21 having four walls adapted to receive an oblong rectangular projection 22 on the socket part 11, the projection 22 having four sides positioned adjacent to the four walls of the recess 21 when the parts are assembled. The arrangement is such that by loosening the screw 18, which extends through the recess 21 and the projection 22 parallel to the recess walls and the projection sides, and partially separating the socket part 11 from the shoulder rest part 10, the socket part 11 may be turned through 180° with respect to the shoulder rest part, and the screw then retightened to secure the parts in the adjusted or new positional relation. In this manner, the socket part 11 may be shifted from the position shown in Figure 1 for left shoulder supporting to the position shown in Figure 2 for right shoulder supporting. Because of the oblong rectangular shapes of the recess 21 and projection 22, it is not possible for the parts 10 and 11 to be secured together, with the projection 22 in the recess 21, in any position other than a position which is proper for holding the hand set 12 either for right shoulder or left shoulder supporting. Positional adjustment of the parts 10 and 11 without the possibility of their being set in any intermediate relative positions, not suited for proper positioning of the hand set, is thus simplified.

As stated above, adjusting the relative positions of the parts for changing from a left shoulder support assembly to a right shoulder support assembly also requires that the hand set 12 be reversed or turned end for end with respect to the socket member 11. This requires that the retaining member 17 be disengaged from the graspable part of the handset 12 to permit the latter to be removed from the socket 16 and reversed, end to end. In accordance with the invention, new and improved means are provided for securing the retaining member 17 to the socket part 11 in a manner permitting the retaining member 17 to be disengaged from the hand set when desired without completely detaching any of the hand set support parts from each other, the arrangement being such as to avoid the annoyance of small screws, fasteners or other parts becoming detached and being dropped inadvertently during the process of changing the positional relation of the socket part 11 and hand set 12. In the construction shown in Figures 1 to 4, the retaining member is formed at one end with an elongated opening or slot 23, both ends of which are closed. A screw 24 extends through the slot 23 and is anchored in the socket part 11 by having threaded engagement with a nut 25 in a nut receiving slot 26 in the socket part intersecting the openings in the retaining member 17 and socket part 11. The other end of the retaining member 17 is formed with an elongated opening or slot 27 which extends inwardly from the end of the retaining member toward the other slot 23, the slot 27 being open at its outer end and, of course, closed at its inner end. A screw 28 extends through the slot 27 and is anchored in the socket part 11 by having threaded connection to a nut 29 in a nut receiving slot 30 in the socket part.

Figures 3, 4, 5:
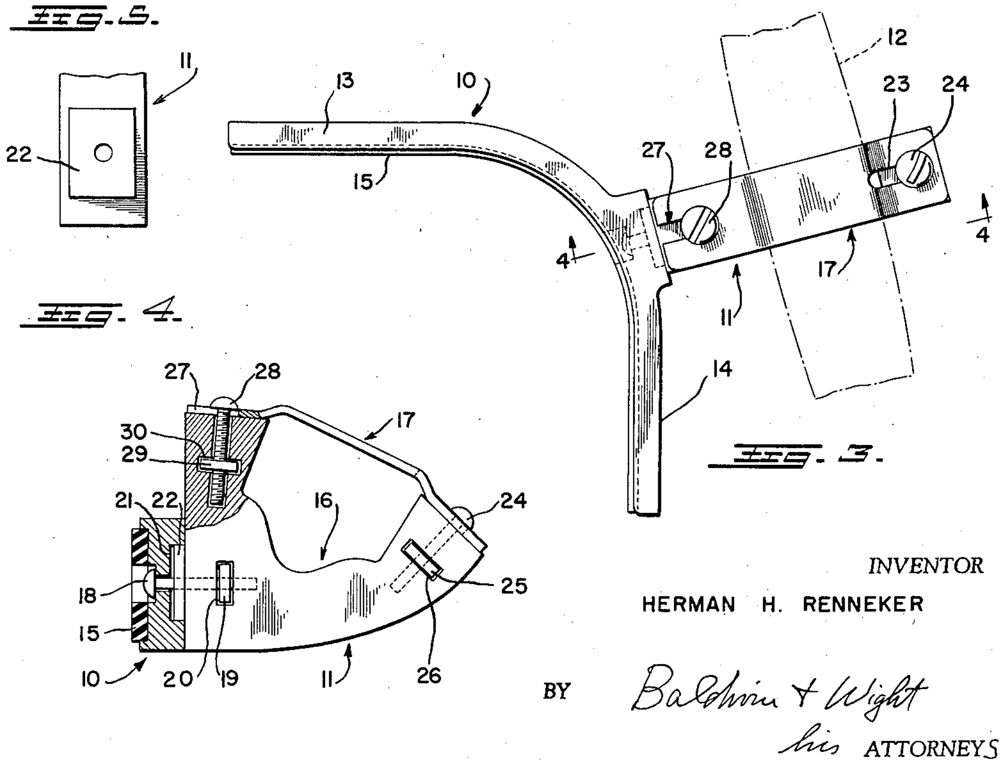
Figure 3 is an elevation showing the parts in the same relative positions as in Figure 1 and indicating the telephone hand set in dot-dash lines.
Figure 4 is a section on the line 4—4 of Figure 3.
Figure 5 is a fragmentary detailed elevational view of a socket member, showing a positioning or locating pad or projection.

When the parts are relatively positioned for left shoulder support, for example as shown in Figures 1, 3 and 4, the retaining member 17 is held in clamping relation to the hand set graspable part by the tightened screws 24 and 28. In order to adjust the parts for right shoulder support, the screw 18 is loosened and the socket part 11 is turned through 180° as previously explained, and the screw 18 is then tightened. The retaining member 17 must be disengaged from the hand set graspable part to permit the latter to be removed from the socket 16 and then re-inserted therein in end-to-end reversed relation. Disengaging of the retaining member 17 without completely disconnecting any of the parts from each other may be effected by simply loosening, but not completely unscrewing, the screws 24 and 28, sliding the retaining member 17 toward the right, as viewed in Figures 3 and 4, so as to disengage the open end slot 27 from the screw 28, and then swinging the retaining member 17 about the screw 24 as a pivot until the retaining member is clear of the open end of the socket 16. Since the slot 23 is longer than the open end slot 27, the retaining member 17 may be displaced longitudinally of the slots 23 and 27 to disengage the slot 27 from its associated securing screw 28 while the slot 23 is still engaged with its associated securing screw 24, thus eliminating the possibility that the retaining member might be dropped, as might happen if it were detached completely from the socket part 11. The construction disclosed thus permits easy removal of the hand set 12 from the socket and re-insertion of the hand set in the socket in reversed position. Thereafter, the retaining member 17 is swung back across the open end of the socket 16 and is then slid to the left, as viewed in Figures 3 and 4, until the screw 28 is again received by the open end slot 27, after which the screws 24 and 27 are tightened.

All of the adjustments or re-positioning of the parts required for adapting the assembly for either right or left shoulder supporting may be made without completely disconnecting any of the parts. This is of particular advantage when, as is often the case, the equipment has to be adjusted by persons not particularly skilled in dis-assembling or assembling small parts.

Figures 6, 7:
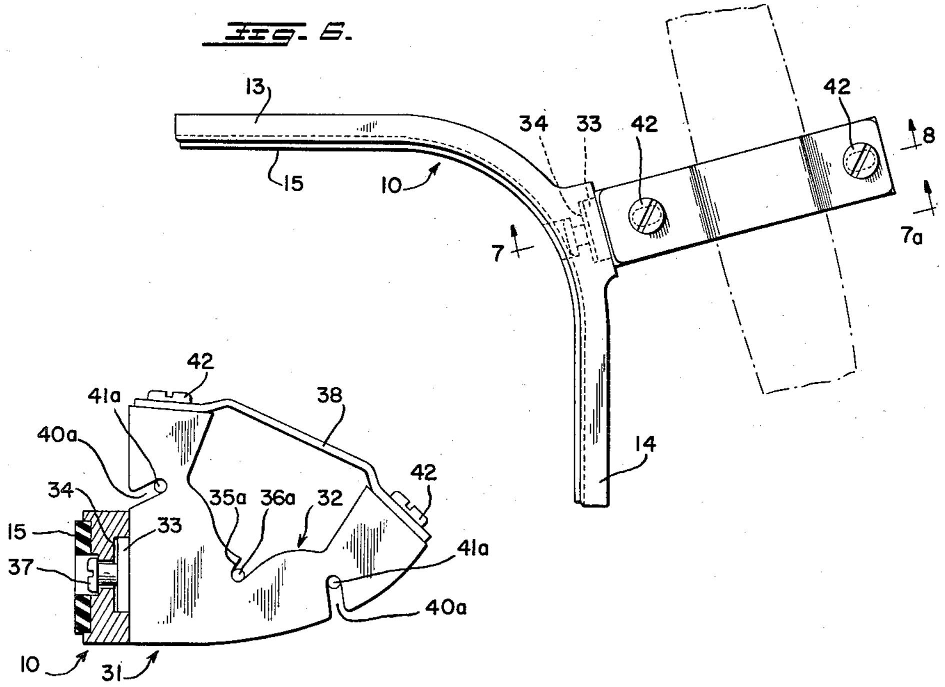
Figure 6 is an elevation of a modified construction showing the parts so relatively positioned as to adapt the assembly for being supported on the user's left shoulder.
Figure 7 is a section on the line 7—7ª of Figure 6.
Figure 8:
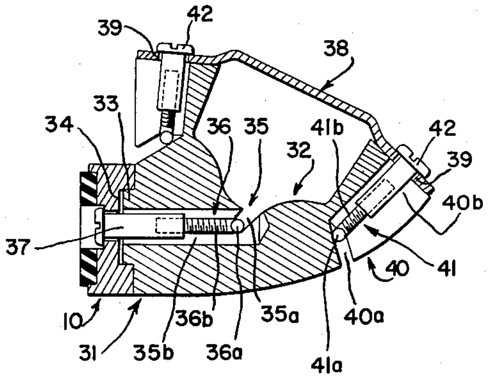
Figure 8 is a section on the line 7—8 of Figure 6.

In the modified construction shown in Figures 6 to 8, the shoulder rest part 10 is the same as that shown in Figures 1 to 5. The socket part 31, shown in Figures 6 to 8, is modified for cooperation with different fasteners or screw elements for securing the socket part to the shoulder rest part and for securing a retaining member 38 to the socket part 31. In this construction the socket part 31 is provided with an open end socket 32 and with an oblong rectangular projection 33 receivable in a similarly shaped recess 34 in the shoulder rest part.

For securing the socket part 31 to the shoulder rest part 10, the socket part is formed with a T-shaped slot generally designated 35 and comprising a cross slot part $35^a$ and a stem slot part $35^b$. A screw device for securing the socket part 31 to the shoulder rest part 10 includes a T-shaped screw element 36 having a cross piece $36^a$ and a shank portion $36^b$, and a headed screw element 37. The T-shaped screw element 36 is positioned in the T-shaped slot 35 with the cross piece $36^a$ received in the cross slot part $35^a$ and the shank portion $36^b$ received in the stem slot part $35^b$. The headed screw element 37 extends through an opening in the shoulder rest part 10 and has threaded connection to the screw shank portion $36^b$. Tightening of the screw element 37 on the screw shank portion $36^b$ draws the head of the screw 37 against the shoulder rest part 10 and draws the screw element cross piece $36^a$ into the root of the cross slot part $35^a$, thus holding the socket part 31 and shoulder rest part 10 securely in adjusted positional relation. In order to permit the socket part 31 to be turned 180° relatively to the shoulder rest part 10 for adjusting the parts for right or left shoulder supporting, the headed screw element 37 is loosened enough to permit the parts 31 and 10 to be separated sufficiently to remove projection 33 from the recess 34, thus enabling the socket part 31 to be turned relatively to the shoulder rest part 10. This may be accomplished without disconnecting the screw element 37 from the T-shaped element 36.

Similar attaching means are provided for securing the ends of the retaining member 38 to the socket part 31. The securing means at the two ends of the retaining member 38 are similar and only one need be described. Considering, for example, the right end of the retaining member 38, as viewed in Figures 6 to 8, an opening 39 in the retaining member is aligned with a T-shaped slot 40 in the socket part, the slot 40 including a cross part $40^a$ and a stem part $40^b$. A screw device received in the slot 40 includes a T-shaped screw element 41 having a cross part $41^a$ located in the slot cross part $40^a$ and a shank $41^b$ in the slot stem part $40^b$. The screw device also includes a headed screw 42 extending through the opening 39 in the retaining member 38 and having threaded engagement with the screw element 41.

When it is desired to disengage the retaining member 38 from the hand set graspable part, the screws 42 at opposite ends of the retaining member 38 may be loosened sufficiently to enable the screw element cross parts $41^a$, or at least one of them, to be displaced outwardly from their or its associated slot cross part $40^a$, thus permitting the retaining member 38 to be displaced to render the slot 32 clear for removal of the hand set from the socket 32 and re-insertion of the hand set in reversed position in the socket. Thereafter, the displaced screw device or devices and the retaining member 38 may be restored to the positions shown in Figure 8 and the screws 42 re-tightened. The removal or displacement of the retaining member 38 may be effected without completely disengaging the screw devices from the retaining member, thus eliminating the chance of dropping of small parts during the changing of the assembly.

Figure 9:
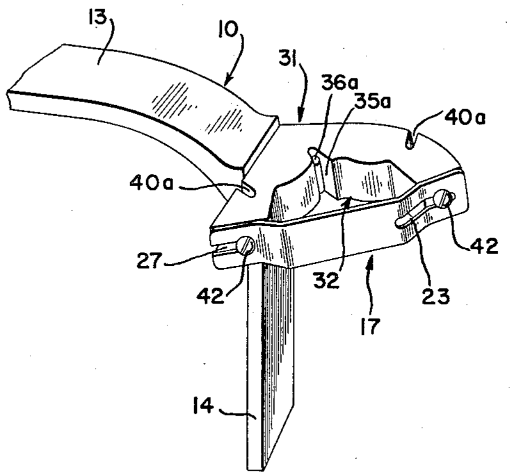
Figure 9 is a perspective view of a further modified assembly with the parts so relatively positioned as to adapt the assembly for being supported on the user's left shoulder.

In the modification shown in Figure 9, the shoulder part 10 and socket part 13 are formed and connected together in the same manner as in the embodiment shown in Figures 6, 7 and 8. So too, the socket member 31 shown in Figure 9 is formed with T-shaped slots the same as the slots 41 shown in Figures 6, 7 and 8, but the retaining member 17 is formed in the same manner as the retaining member shown in Figures 1 to 4, that is, with one slot 23 closed at both of its ends and with one slot 27 opening inwardly from the end of the retaining member. In the construction shown in Figure 9 the retaining member is secured to the socket part 31 by screw devices the same as the screw devices shown in Figures 6 to 8, inclusive. The stem portion 40$^b$ of each T-shaped slot 40 is in a plane at an obtuse angle to a plane containing the associated slot cross portion 40$^a$. This angularity is such as to cause the screw devices to be maintained in their respectively associated T slots when the screw elements 42 have been loosened only sufficiently to permit the retaining member to be slid longitudinally and swung to one side to clear the socket for removal and re-insertion of the hand set graspable part. If the screw elements 42 should be loosened more than is required for this operation, the screw devices may be prevented from becoming detached from the socket member 31 by simply covering the slot parts 40$^a$ with the thumb and forefinger.

With the screws 42 loosened, the retaining member 17 may be slid to the right, as viewed in Figure 9, until the slot 27 is disengaged from the screw element 42, whereupon the retaining member 17 may be swung aside, permitting the hand set graspable part to be removed from and then inserted into the socket 32 in reversed relation to the part 31. Finally, the retaining member 17 may be swung back over the socket 32, and slid to the left until the left hand screw 42 is received in the slot 27, after which the screws 42 are tightened.

The constructions shown embody the invention in preferred forms, but it is intended that the disclosure be illustrative rather than definitive, the invention being defined in the claims.

I claim:

1. In a telephone hand set support, a shoulder rest part; a hand set attaching part securable to a hand set, one of said parts being provided with a rectangular recess having four walls and the other of said parts being provided with a rectangular projection having four sides receivable in said recess selectively in either of only two different positions with the four sides of said projection respectively adjacent to the four walls of said recess for positioning said attaching part selectively in either of only two different dispositions relative to said shoulder rest part, one of said dispositions being substantially 180° displaced from the other of said dispositions; and means extending through said recess and said projection parallel to said walls and said sides for securing said parts together in the selected disposition of said attaching part.

2. In a telephone hand set support, a shoulder rest part; a hand set attaching part securable to a hand set, one of said parts being provided with an oblong recess having four walls and the other of said parts being provided with an oblong projection having four sides receivable in said recess selectively in either of only two different positions with the four sides of said projection respectively adjacent to the four walls of said recess for positioning said attaching part selectively in either of only two different dispositions relative to said shoulder rest part, one of said dispositions being substantially 180° displaced from the other of said dispositions; and means extending through said recess and said projection parallel to said walls and said sides for securing said parts together in the selected disposition of said attaching part.

3. In a telephone hand set support, a shoulder rest part; a hand set attaching part securable to a hand set, one of said parts being provided with a rectangular recess and the other of said parts being provided with a rectangular projection receivable in said recess selectively in either of two different positions for positioning said attaching part selectively in either of two different dispositions relative to said shoulder rest part, one of said dispositions being substantially 180° displaced from the other of said dispositions; and means for securing said parts together in the selected disposition of said attaching part, said securing means comprising aligned openings in said parts extending through said recess and said projection, a nut receiving slot in one of said parts intersected by the opening therein, a nut in said slot, and a screw extending through the other of said parts and said aligned openings and having threaded connection to said nut.

4. In a telephone hand set support, a shoulder rest part; a hand set attaching part securable to a hand set, one of said parts being provided with a rectangular recess and the other of said parts being provided with a rectangular projection receivable in said recess selectively in either of two different positions for positioning said attaching part selectvely in either of two different dispositions relative to said shoulder rest part, one of said dispositions being substantially 180° displaced from the other of said dispositions; and means for securing said parts together in the selected disposition of said attaching part, said securing means comprising aligned openings in said parts extending through said recess and said projection, a cross slot in one of said parts intersected by the opening therein, a T-shaped screw element having a cross portion seated in said cross slot and a threaded portion extending into the intersecting opening, and another screw element extending through the other of said parts and into the other aligned opening and having threaded engagement with the threaded portion of said T-shaped screw element.

5. In a telephone hand set support, a shoulder rest part; and a hand set attaching part, said hand set attaching part comprising a socket part formed with an open end socket for receiving the graspable part of a telephone hand set; a retaining member for spanning said socket open end to hold the hand set graspable part in said socket and being formed at one of its ends with a first elongated slot both ends of which are closed, and said retaining member being formed at the other of its ends with a second elongated slot extending inwardly from said other of said ends of said retaining member, said second slot being open at said other of said ends of said retaining member; and securing means respectively extending through said slots and being anchored in said socket part, said first slot being sufficiently longer than said second slot that when said securing means are loosened without being removed from said socket part and said retaining member is displaced longitudinally of said slots said second slot will be disengaged from the associated securing means while said first slot is still engaged with its associated securing means, whereby said retaining member may be swung clear of said socket to enable a hand set graspable part to be inserted into or removed from said socket without totally disconnecting said retaining member from said socket part.

6. In a telephone hand set support, a shoulder rest part; and a hand set attaching part, said hand set attaching part comprising a socket part formed with an open end socket for receiving the graspable part of a telephone hand set; a retaining member for spanning said socket open end to hold the hand set graspable part in said socket and being formed at one of its ends with a first elongated slot both ends of which are closed, and said retaining member being formed at the other of its ends with a second elongated slot extending inwardly from said other of said ends of said retaining member, said second slot being open at said other of said ends of said retaining member; and screws respectively extending through said slots and being threaded in said socket part, said first slot being sufficiently longer than said second slot that when said screws are loosened without being removed from said socket part and said retaining member is displaced longitudinally of said slots said second slot will be disengaged from the associated screw while said first slot is still engaged with its associated screw whereby said retaining member may be swung clear of said socket to enable a hand set graspable part to be inserted into or removed from said socket without totally disconnecting said retaining member from said socket part.

7. In a telephone hand set support, a shoulder rest part; a socket part formed with an open end socket for receiving the graspable part of a telephone hand set, one of said parts being provided with a rectangular recess and the other of said parts being provided with a rectangular projection receivable in said recess selectively in either of two different positions for positioning said socket part selectively in either of two dispositions relative to said shoulder rest part, one of said dispositions being substantially 180° displaced from the other of said dispositions; means for securing said parts together in the selected relative disposition thereof; a retaining member for spanning said socket open end to hold the hand set graspable part in said socket and being formed at one of its ends with a first elongated slot both ends of which are closed and said retaining member being formed at the other of its ends with a second elongated slot extending inwardly from said other of said ends of said retaining member, said second slot being open at said other of said ends of said retaining member; and securing means respectively extending through said slots and being anchored in said socket part, said slot being sufficiently longer than said second slot that when said securing means are loosened without being removed from said socket part and said retaining member is displaced longitudinally of said slots said second slot will be disengaged from the associated securing means while said first slot is still engaged with its associated securing means, whereby said retaining member may be swung clear of said socket to enable a hand set graspable part to be inserted into or removed from said socket without totally disconnecting said retaining member from said socket part.

8. In a telephone hand set support, a shoulder rest part; and a hand set attaching part, said hand set attaching part comprising a socket part formed with an open end socket for receiving the graspable part of a telephone hand set; a retaining member for spanning said socket open end to hold the hand set graspable part in said socket; and means for respectively securing opposite ends of said retaining member to said socket part, one of said means comprising an opening in the associated end of said retaining member, a generally T-shaped slot in said socket part, and a screw device comprising a first screw element of generally T-shape fitting into said T-shaped slot and a second screw element extending through said opening and having threaded engagement with said first screw element.

9. In a telephone hand set support, a shoulder rest part; and a hand set attaching part, said hand set attaching part comprising a socket part formed with an open end socket for receiving the graspable part of a telephone hand set; a retaining member for spanning said socket open end to hold the hand set graspable part in said socket; and means for respectively securing opposite ends of said retaining member to said socket part, one of said means comprising an opening in the associated end of said retaining member, a generally T-shaped slot in said socket part, and a screw device comprising a first screw element of generally T-shape fitting into said T-shaped slot and a second screw element extending through said opening and having threaded engagement with said first screw element, said T-shaped slot opening outwardly of said socket part, whereby to enable said screw device to be displaced from said T-shaped slot without disconnecting said screw elements from each other and without disconnecting said screw device from said retaining member.

10. In a telephone hand set support, a shoulder rest part; and a hand set attaching part, said hand set attaching part comprising a socket part formed with an open end socket for receiving the graspable part of a telephone hand set; a retaining member for spanning said socket open end to hold the hand set graspable part in said socket; and means for respectively securing opposite ends of said retaining member to said socket part, one of said means comprising an opening in the associated end of said retaining member, a generally T-shaped slot in said socket part, and a screw device comprising a first screw element of generally T-shape having a cross piece fitting in the cross part of said generally T-shaped slot and a threaded shank fitting in the other part of said generally T-shaped slot, and a second screw element having a head disposed on the side of said retaining member opposite said socket part and a threaded stem extending through said opening and having threaded engagement with said threaded shank.

11. In a telephone hand set support, a shoulder rest part; and a hand set attaching part, said hand set attaching part comprising a socket part formed with an open end socket for receiving the graspable part of a telephone hand set; a retaining member for spanning said socket open end to hold the hand set graspable part in said socket and being formed at one of its ends with a first elongated slot both ends of which are closed, and said retaining member being formed at the other of its ends with a second elongated slot extending inwardly from said other of said ends of said retaining member; and means respectively extending through said slots and into said socket part for securing opposite ends of said retaining member to said socket part, one of said securing means comprising a generally T-shaped slot in said socket part and a screw device comprising a first screw element of generally T-shape fitting in said T-shaped slot and a second screw element extending through said second elongated slot and having threaded connection with said first screw element, said generally T-shaped slot comprising a first portion in a first plane containing the threaded portions of said screw elements and a second portion in a second plane at an obtuse angle to said first plane, said first slot portion receiving the threaded portions of said screw device, and said second slot portion receiving the cross piece of said T-shaped screw element, both of said slot portions opening outwardly of said socket part whereby to enable said screw device to be displaced from said T-shaped slot without disconnecting said screw elements from each other and without disconnecting said screw device from said retaining member, the angularity of said first and second planes enabling said screw device to be maintained in said T-shaped slot when said screw elements have been loosened relatively to each other only sufficiently to permit said retaining member to be swung to one side of the axis of said screw device when both said screwing means have been loosened and said retaining member has been displaced longitudinally of said elongated slots sufficiently to disengage said second elongated slot from said second screw element.

References Cited in the file of this patent

UNITED STATES PATENTS

| | | |
|---|---|---|
| 2,476,221 | Renneker | July 12, 1949 |
| 2,525,699 | Maldonado | Oct. 10, 1950 |
| 2,785,234 | Del Busto | Jan. 31, 1956 |